(No Model.)

T. SHANKS.
COMBINED DUST PAN AND ANIMAL TRAP.

No. 583,339. Patented May 25, 1897.

Witnesses
F. C. Barry
C. M. Werle

Inventor
Thomas Shanks
by O. E. Duff
Attorney

THE NORRIS PETERS CO., PHOTO-LITHO., WASHINGTON, D. C.

UNITED STATES PATENT OFFICE.

THOMAS SHANKS, OF BALTIMORE, MARYLAND.

COMBINED DUST-PAN AND ANIMAL-TRAP.

SPECIFICATION forming part of Letters Patent No. 583,339, dated May 25, 1897.

Application filed October 2, 1896. Serial No. 607,652. (No model.)

*To all whom it may concern:*

Be it known that I, THOMAS SHANKS, of Baltimore city, in the State of Maryland, have invented certain new and useful Improvements in a Combined Dust-Pan and Animal-Trap; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to dust-pans, and has for its object the construction of a dust-pan which shall also serve the purpose of a mouse or animal trap.

With this object in view my invention consists in the improved construction, arrangement, and combination of parts hereinafter fully described and afterward specifically pointed out in the claims.

Figure 1:
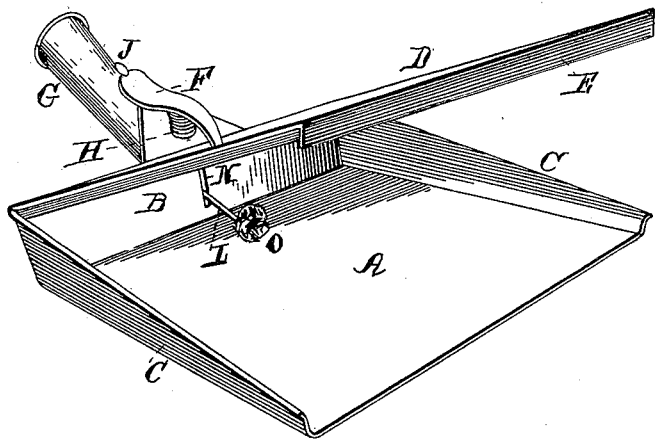
Figure 2:
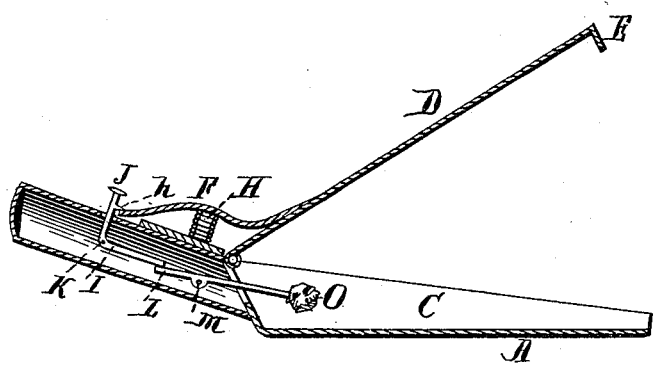

In the accompanying drawings, Figure 1 is a view in perspective showing my invention with the dust-pan open in position to receive dust from the floor or to admit a mouse or other animal, the trap being set. Fig. 2 is a central vertical longitudinal section through my invention, the parts being in the position for use as a dust-pan.

Like letters of reference mark the same parts in both figures.

Referring to the drawings by letters, A is the platen or floor of the dust-pan, which has a rear wall B and side walls C of any ordinary or preferred construction. To the top of the rear wall B is hinged the lid D, which is provided with a downwardly-extending lip E at its forward edge. A thumb-piece F is rigidly mounted on the top of the lid D and projects rearwardly over the handle G. A spring H is located between the thumb-piece F and handle G, which serves to normally hold the lid down upon the pan, thus perfectly closing it and confining anything that may be within it. A catch $h$ is provided to hold the lid open.

The construction thus far described forms a complete dust-pan to be used in the usual manner, too well known to need description, the lid being held up against the pressure of the spring by pressure of the thumb on the thumb-piece, the spring acting, as before described, to close the lid on the pan when the pressure of the thumb is removed from the thumb-piece. To convert this dust-pan into a perfect mouse or animal trap, the following mechanism is provided:

I is an elbow-lever, with the upper end of its vertical arm formed into a latch J, in this case in the form of a button, and having its horizontal arm extending longitudinally in the handle G. This lever is pivoted at its angle K in the handle.

L is a trigger pivoted in the handle at M. One end of this trigger rests under the inner end of the elbow-lever I, while its other end passes through a vertical slot N in the rear wall of the dust-pan and carries bait O.

When the thumb-piece is depressed to raise the lid, the latch-button J of the elbow-lever I will slip over it and hold it down until released. This leaves the lid raised and the trap set, as shown in Fig. 1.

When a mouse or other animal enters the pan and nibbles at the bait, the trigger will be depressed at the bait end, raising the opposite end and operating the elbow-lever to cause the latch-button to be moved off the thumb-piece and permitting the lid to be instantly closed down by the spring.

The latch-button J is so formed on its under side that it may be easily released. This would render it comparatively useless to hold the lid open when the dust-pan is used for its usual purpose. To obviate this, I provide the positive latch $h$ below the button J, which will firmly hold the parts in the position shown in Fig. 2.

While I have shown these means for carrying out my invention, I desire it to be understood that I do not confine myself thereto, but consider myself entitled to any variation therefrom resulting from the exercise of mechanical skill which may come within the scope of my invention.

Having thus fully described my invention, what I claim as new, and desire to secure by Letters Patent of the United States, is—

1. A combined dust-pan and animal-trap comprising in its construction a pan, a lid hinged to its back wall, a hollow handle, a thumb-piece on the lid projecting over the handle, a spring between the handle and thumb-piece, and a latch-and-trigger mechanism inclosed in the handle and projecting into the pan, as set forth.

2. The combination with the dust-pan having a vertical slot in its rear wall, of a lid hinged to said rear wall, a hollow handle, a thumb-piece secured to the lid and projecting over the handle, a spring to normally hold the lid closed, a pivoted latch-lever projecting through the top of the handle and engaging the end of the thumb-piece, and a trigger pivoted in the handle having one end under the latch-lever and the other end through the vertical slot in the rear wall of the pan to receive the bait, substantially as set forth.

3. In combination of the dust-pan having spring closing-lid, the trigger mechanism pivoted in the handle and projecting into the dust-pan, and the elbow-lever pivoted in the handle, engaging the trigger and provided with the latch $h$, and latch-button J, substantially as set forth.

In testimony that I claim the forgoing as my own I affix my signature in presence of two witnesses.

THOMAS SHANKS.

Witnesses:
F. C. BARRY,
ADOLPH G. WOLF.